United States Patent [19]
Brown

[11] Patent Number: 5,103,699
[45] Date of Patent: Apr. 14, 1992

[54] TUBE CUTTER

[76] Inventor: Brian P. Brown, 123 Canonchet Trail, Cranston, R.I. 02921

[21] Appl. No.: 666,575

[22] Filed: Mar. 8, 1991

[51] Int. Cl.$^5$ .............................................. B23B 5/14
[52] U.S. Cl. ................................... 82/73; 30/97; 30/101; 82/76
[58] Field of Search ................... 82/73, 74, 92, 61, 62, 82/70.1, 70.2, 99.1; 30/97, 101, 418

[56] References Cited

U.S. PATENT DOCUMENTS

| | | | |
|---|---|---|---|
| 1,160,387 | 11/1915 | Curtis | 82/61 |
| 2,373,472 | 4/1945 | Haumiller | 30/97 X |
| 3,162,946 | 12/1964 | Martindale | 30/101 |
| 3,553,318 | 10/1970 | Bonnet et al. | 82/70.2 |
| 3,641,851 | 2/1972 | Gibbs et al. | 82/73 |
| 4,227,431 | 10/1980 | Wells | 30/101 X |
| 4,739,685 | 4/1988 | Ricci | 30/97 X |
| 4,762,038 | 8/1988 | Olson | 30/97 X |
| 4,953,292 | 9/1990 | Tobey | 30/97 |

Primary Examiner—Z. R. Bilinsky
Attorney, Agent, or Firm—Salter & Michaelson

[57] ABSTRACT

Cutter for tube or pipe, including a drive head, an elongated main body having one end carried in the head, and a cam element carried on the other end of the main body. The head, body, and element have aligned similar bores to receive a tube. The main body carries cutters which move radially inwardly of its bore to engage and cut the tube when the main body is rotated about the axis of its bore relative to the head and the cam element.

5 Claims, 2 Drawing Sheets

TUBE CUTTER

BACKGROUND OF THE INVENTION

In the plumbing, heating, and construction trades, a common operation is the cutting of tubing or pipe into desired lengths. This operation is performed either with the tube held in a vise, or with the tube fastened at one end into previously installed portions of a tubing network, or with the tube free at both ends. In the past, the cutting has taken place either by the use of a hacksaw or by the use of a caliper-type pipe cutter. The latter tool makes use of a C-shaped frame that embraces the part of the tube to be cut and that has a cutting disk that scores and cuts the tube as the tool is rotated about the tube.

In the case of the hacksaw, it is difficult to make a cut that is clean and square with the axis of the tube. The caliper-type pipe cutter performs the cutting operation very slowly, and since it is difficult to maintain it in the desired right-angle plane while swinging it about the tube, results in less than a clean, accurate cut. When the cut end of the tube is not perfect, difficulties are experienced when the cut length of tube is assembled with the fittings and couplings of the plumbing or heating network.

Attempts have been made in the past to develop a more effective and efficient cutter for tubular elements. An example of such a cutter is shown and described in the U.S. Pat. No. 4,227,431 to WELLS. This patent shows an axial tube cutter that is particularly adapted to be used in removing electrical connector coupling rings from an assembly. It consists of a manually-operated tool with cutter disks rotatably mounted on hinged arms, so that the cutter disks can be moved radially toward and away from the axis of the ring that is to be cut.

It can be seen, then, that the prior art tools operate very slowly, make use of intensive hand labor, and depend for their accuracy on fallible human skill.

These and other difficulties experienced with the prior art devices have been obviated in a novel manner by the present invention.

It is, therefore, an outstanding object of the invention to provide a tube cutter that operates very quickly and efficiently.

Another object of this invention is the provision of a tube cutter whose accuracy is not dependant on the skill of the operator.

A further object of the present invention is the provision of a tube cutter that allows an unskilled worker to produce a cut tube end that is perfectly square with the axis of the tube and whose surface is perfectly formed.

A still further object of the invention is the provision of a tube cutter that is motor-driven and produces a cut end that can be incorporated without difficulty into a plumbing or heating assemblage.

It is a further object of the invention to provide a tube cutter that is simple and rugged in construction, which can be easily manufactured from readily-available materials, and which is capable of a long life of useful service with a minimum of maintenance.

Another object of the invention is the provision of a tube cutter in which the cut can be accurately located even when made by an unskilled operator.

With these and other objects in view, as will be apparent to those skilled in the art, the invention resides in the combination of parts set forth in the specification and covered by the claims appended hereto.

SUMMARY OF THE INVENTION

In general, the invention relates to a tube cutter which has an elongated tubular main body having a longitudinal bore in which a tube to be cut is positioned. A cutter is fastened to the exterior of the main body and is movable in and out of a circumferential slot formed in the body and communicating with the bore. A drive means is provided for simultaneously rotating the main body relative to the tube and moving the cutter radially inwardly through the slot into cutting contact with the tube.

More specifically, the drive means includes a head mounted on one end of the main body and a cam element mounted on the other end. The head, main body, and the cam element all have aligned similar bores to receive the tube. The drive head and the cam element are connected for non-rotative, longitudinal movement relative to each other. Rotation of the main body causes longitudinal movement of the cam element, thus bringing a cam surface into contact with the cutter and causing it to move inwardly.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
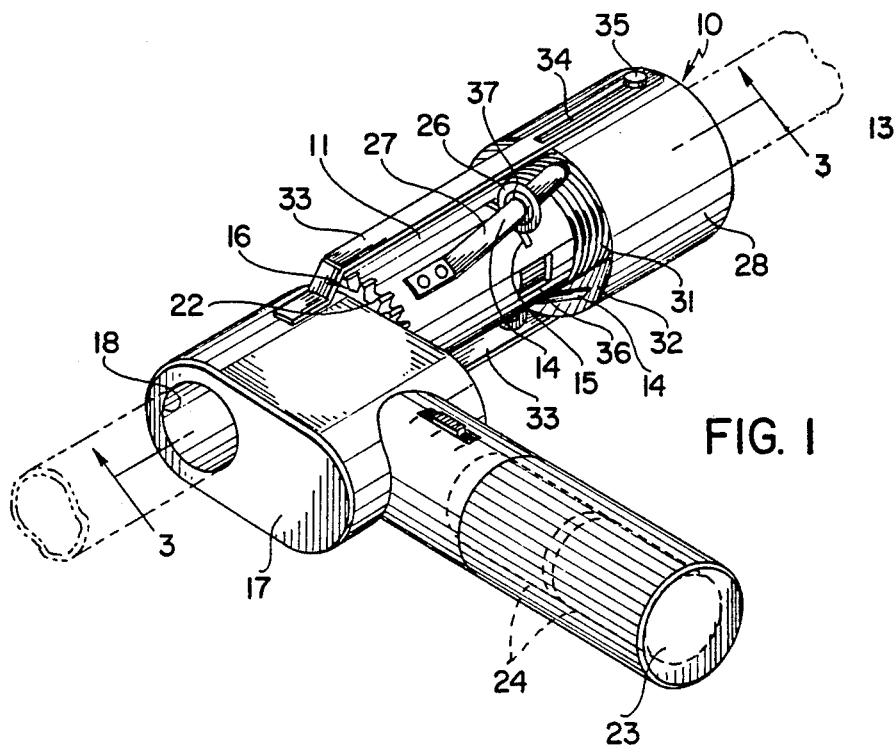
FIG. 1 is a perspective view of a tube cutter embodying the principles of the present invention.
Figure 2:
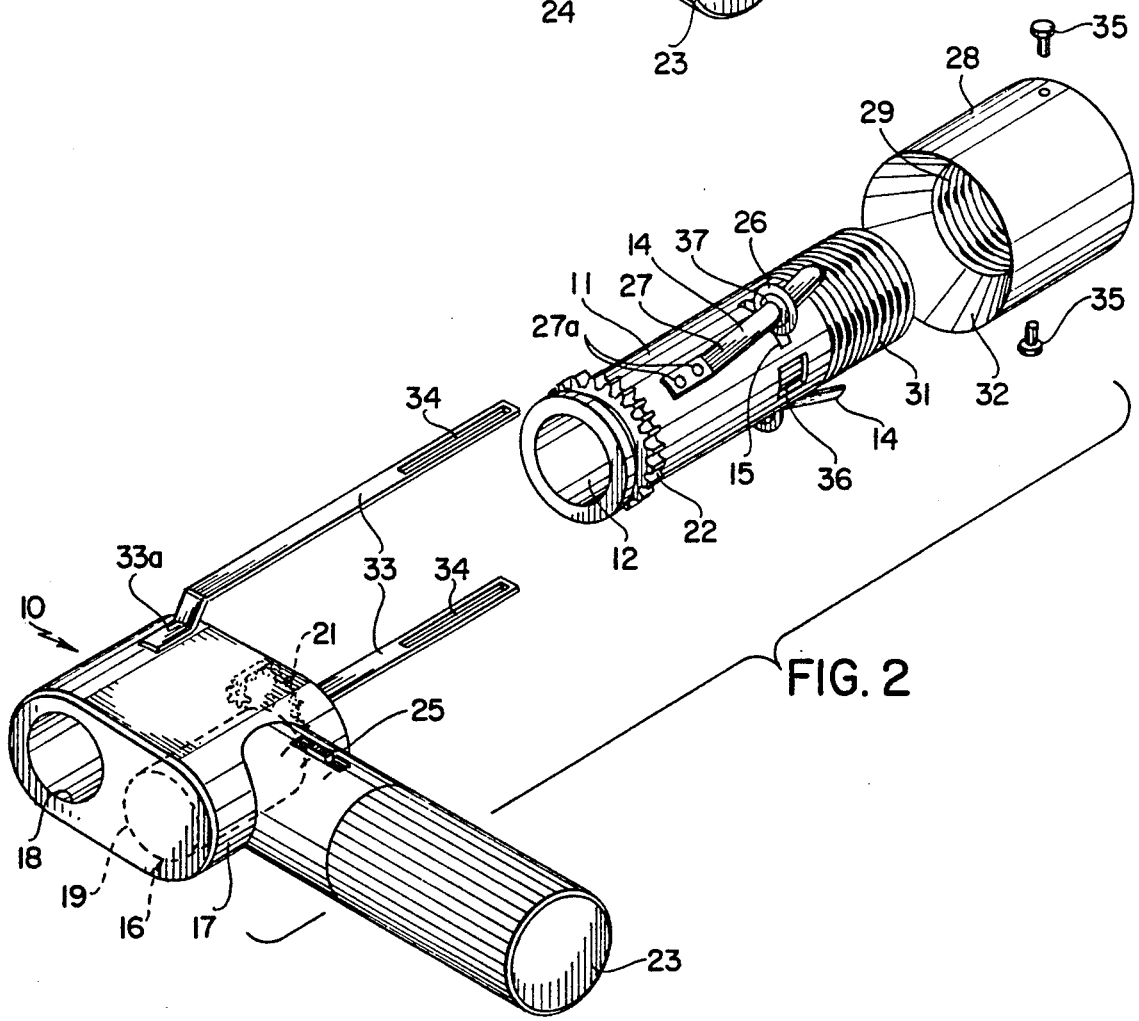
FIG. 2 is an exploded perspective view of the tube cutter.

Referring first the FIGS. 1 and 2, which best show the general features of the invention, the tube cutter, indicated generally by the reference numeral 10, is shown as having an elongated, generally tubular main body 11 in which is formed a longitudinal bore 12 that is sized to receive a tube 13. A cutter 14 is fastened to the exterior of the main body and is movable in and out of a circumferential slot 15 in the body. The slot extends completely through the body wall, i.e. from the exterior surface to the bore 12. A drive means, indicated generally by the reference numeral 16, is provided for simultaneously rotating the main body relative to the tube and moving the cutter radially inwardly through the slot into cutting contact with the tube 13.

The main body 11 is rotatably carried in a drive head 17 which has a bore 18 to receive the end of the main body and through which the tube 13 can pass. An electrical motor 19 is carried in the head and is located laterally of the bore 18. A pinion gear 21 is driven by the motor shaft and drivingly engages a ring gear 22 mounted on the exterior surface of the main body.

As is evident in FIG. 1, the drive head 17 is provided with a hollow handle 23 that extends laterally of the centerline of the main body. Batteries 24 are carried in the handle and are electrically connected to the motor through a reversing switch 25.

The cutter 14 includes a cutting disk 26 rotatably mounted on an arm 27. This arm is formed as a leaf spring, one end of which is fixedly fastened to the exterior surface of the main body as at 27a, the disk 26 being carried adjacent the other end. In the preferred embodiment, three such cutters 14 and corresponding slots 15 are provided on the main body. The arms are coextensive and are spaced equally around the main body.

A cam element 28, in the nature of a threaded nut, engages the cutters 14 to move them radially inwardly when the main body rotates. The cam element is provided with a threaded bore 29 that threadedly engages external threads 31 on the main body. The rotation of the main body causes the threads to effect longitudinal movement of the cam element, which has a conical inner surface 32 which engages the cutters to move them inwardly.

Diametrically opposed struts 33 are fixed at one end to the drive head 17 as at 33a and extend longitudinally from the drive head to the cam element 28. Each strut is connected to the cam element by a longitudinal slot 34 in the strut through which pin 35 passes into securement with the cam element.

It is evident, then, that the drive head 17, the main body 11, and the cam element 28 are provided with aligned, similar bores 12, 18, and 29, respectively, to receive the tube 13. Similarly, it is clear that the nature of the struts and their connections to the drive head and cam element serve to prevent rotation of the cam element relative to the drive head, while allowing longitudinal movement of the cam element relative to the drive head. A window 36 is positioned in the wall of the main body and is located adjacent each of the cutters to permit observation of the tube, specifically to facilitate proper positioning of the tube relative to cutters 14 so that cutting of the tube will take place at the precis point where such is desired. In the preferred embodiment of the invention, the disk or cutting blade 26 of each cutter 14 is attached to its arm 27 by a universal bearing 37 to permit rotation of disc 26 as the cutting action is taking place.

The operation and advantages of the invention will now be readily understood in view of the above description. First of all, the tube 13 is inserted into the tube cutter 10. The tube may be a copper plumbing or heating tube, it may be a plastic tube, or it may be a steel pipe, such as is used in commercial electrical wiring. In any case, the tube can be inserted from either end of the tube cutter, so that it extends through the bores 12, 18, and 29. Usually, the tube 13 will be provided with a pencil mark 38 or a scratch to indicate where the cut is to take place. The tube is moved longitudinally until it is evident through the window 36 that the mark is properly aligned with the cutter disk 26.

Figure 3:
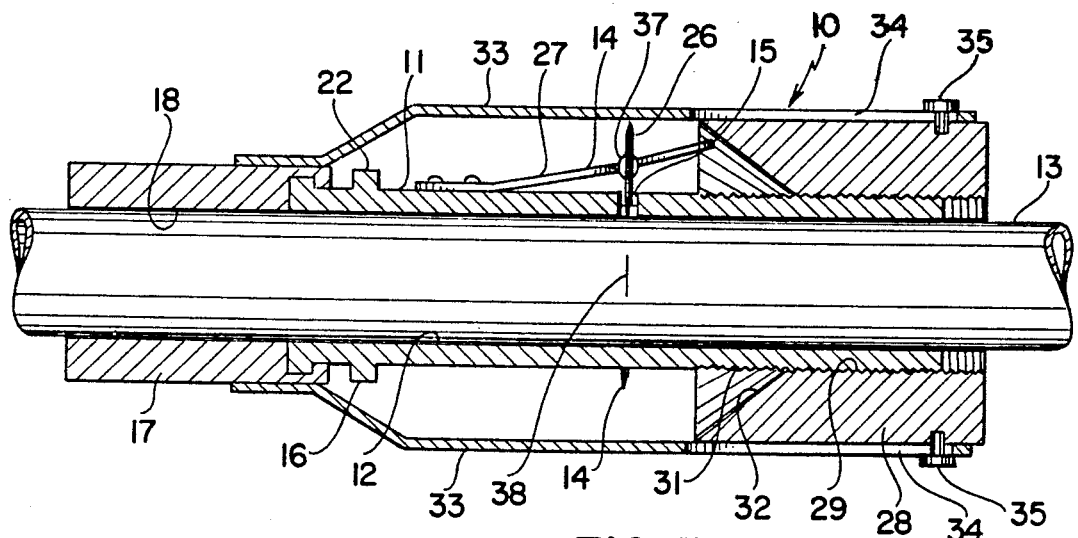
FIG. 3 is a sectional view of the invention in a first non-cutting position, taken on the line 3—3 of FIG. 1.
Figure 4:
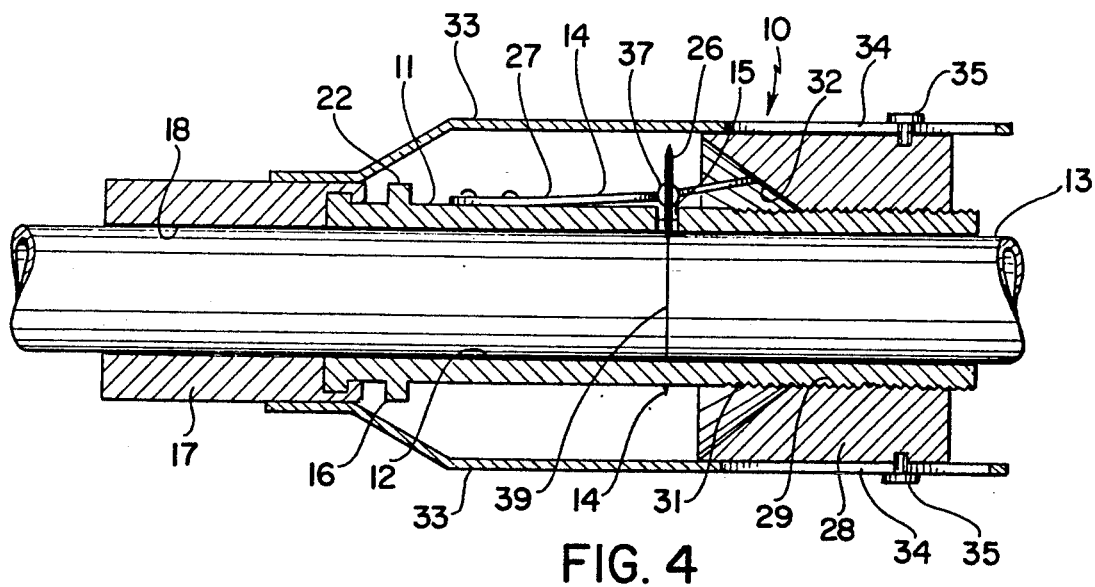
FIG. 4 is a sectional view that is similar to that of FIG. 3, but showing the invention in a second cutting position.

The handle 23 is held in the left hand of the operator (if he is right-handed), while the tube 13 is grasped in his right hand. The apparatus is then in the "first" or noncutting mode shown in FIG. 3. When the mark 38 is lined up, as described above, the operator actuates the switch 25 in the "forward" direction, thus causing the motor 19 to act through the pinion gear 21 and the ring gear 22 to rotate the main body 11 relative to the head 17 and the cam element 28. This causes relative rotation between the threaded bore 29 in the cam element and the external threads 31 on the main body, so that the cam element advances toward the main body. Eventually, the conical surface 32 of the cam element contacts the free ends of the cutter arms 27. As the advance of the cam element continues, the arms with their cutter disks 26 are forced radially inwardly until the disks pass through the slots 15. This inward movement takes place until the disks contact the surface of the tube 13. At that time, the apparatus is in the "second" or cutting mode shown in FIG. 4. The tube is held fixedly (relative to the main body and the cutters) by the operator as main body 11 rotates relative to tube 13, and the disks simultaneously penetrate through the tube material, thus producing a cut 39. Eventually, the cut is completed and the tube is severed. The operator senses this completion of the cut and actuates the switch 25 in the reverse or "outward" direction. The motor reverses the rotation of the main body, thus causing the cam element to move outwardly and to allow the arms, due to their inherent resilience, to move the disks away from the tube and out of the slots 15. The two parts of the tube are removed from the tube cutter 10, so that it is in condition for the next tube cutting operation.

It can be seen, then, that the tube cutter 10 is operated by energizing the motor 19, which means that the operator can concentrate on locating the cutters accurately on the mark 38. At the same time, he is relieved of the strenuous work of swinging the cutter about the tube, as was necessary with the prior art devices. Because the cutters are automatically held in accurate, repeatable positions relative to the axes of the successive tubes, the surfaces of the cuts are formed so as to be smooth and to extend at right angles to the tube axes. This makes the later operations with the tube, i.e., the assembly in the plumbing or heating network, much simpler and more effective. Additionally, the cutting operation takes place quickly, while at the same time making it possible to carry out rapidly the assembly into the network.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Tube cutter, comprising:
   (a) generally tubular main body having a bore in which a tube may lie,
   (b) a cutter fastened to the exterior of the main body and movable in and out of a circumferential slot in the body,
   (c) drive means for simultaneously rotating the main body relative to the tube and moving the cutter radially inwardly through the slot into cutting contact with the tube,
   (d) said cutter comprising a disk rotatably mounted on an arm which extends longitudinally of the main body, and
   (e) said arm comprising a leaf spring, one end of which is fixed to the main body, the disk being mounted adjacent the other end.

2. Tube cutter as recited in claim 1, wherein there are a plurality of such cutters with corresponding slots mounted on the main body, the arms being coextensive and equally spaced around the main body.

3. Tube cutter, comprising
   (a) generally tubular main body having a bore in which a tube may lie, (b) a cutter fastened to the exterior of the main body and movable in and out of a circumferential slot in the body, (c) drive means for simultaneously rotating the main body relative to the tube and moving the cutter radially inwardly through the slot into cutting contact with the tube, (d) a cam element in engagement with said cutter to move it radially inwardly as the main body rotates, and (e) said cam element having a threaded bore that meshes with corresponding external threads on the main body, the rotation of the main body causing relative longitudinal movement of the cam element, the cam element having a conical surface which engages the cutter to move it radially inwardly.

4. Tube cutter, comprising (a) generally tubular main body having a bore in which a tube may lie, (b) a cutter fastened to the exterior of the main body and movable in and out of a circumferential slot in the body, (c) drive means for simultaneously rotating the main body relative to the tube and moving the cutter radially inwardly through the slot into cutting contact with the tube, (d) said main body being rotatably carried in a drive head, the head having a bore to receive the main body through which the tube can pass, and (e) the means for moving the cutter inwardly comprising a cam element located at the end of the main body opposite from said drive head, and struts extending from the head to the cam element, each strut being connected to the cam element by a longitudinal slot in the strut through which a pin extends into securement with said cam element.

5. Tube cutter as recited in claim 4, wherein the cam element is provided with a threaded bore for engagement with corresponding external threads on the main body, so that rotation of the main body effects relative longitudinal movement of the cam member.

* * * * *